B. W. KADEL.
CAR TRUCK.
APPLICATION FILED JAN. 28, 1921. RENEWED MAR. 17, 1922.
1,414,963.
Patented May 2, 1922.
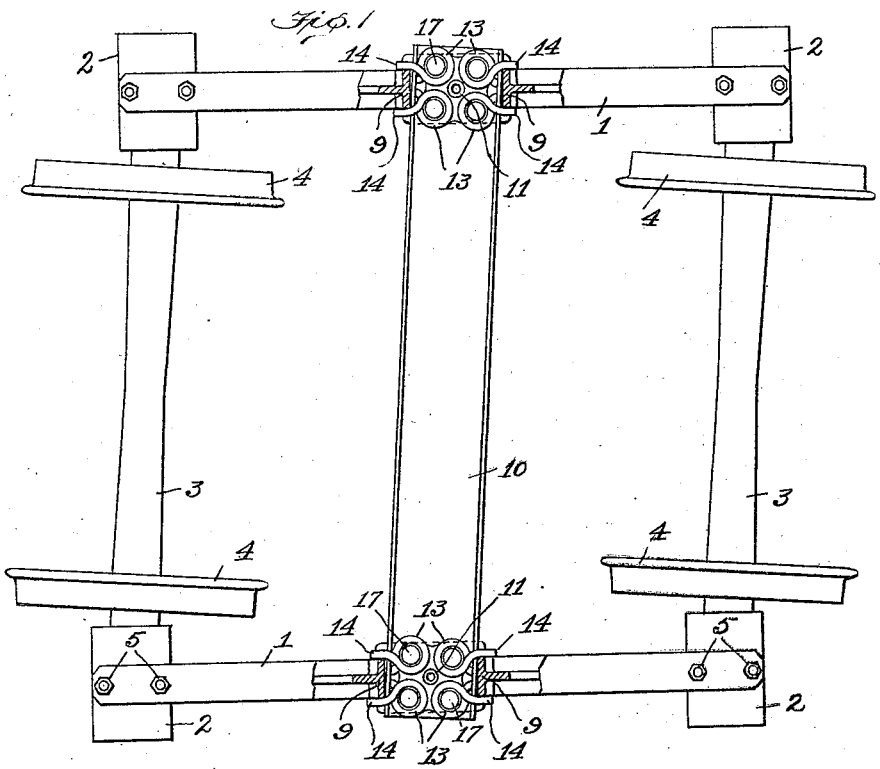
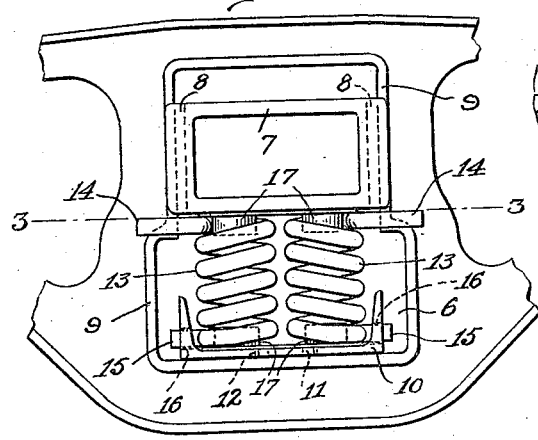
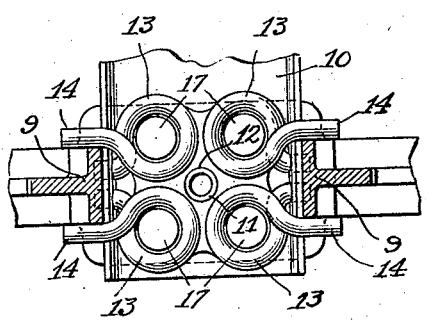
Witness
Edwin L. Bradford
Inventor
Byars W. Kadel
By Ernest J. Mechlin
his Attorney

UNITED STATES PATENT OFFICE.

BYERS W. KADEL, OF BALTIMORE, MARYLAND, ASSIGNOR TO THE T. H. SYMINGTON COMPANY, OF NEW YORK, N. Y., A CORPORATION OF DELAWARE.

CAR TRUCK.

1,414,963.  Specification of Letters Patent.  Patented May 2, 1922.

Application filed January 28, 1921, Serial No. 440,594. Renewed March 17, 1922. Serial No. 544,685.

*To all whom it may concern:*

Be it known that I, BYERS W. KADEL, a citizen of the United States, residing at Baltimore, in the State of Maryland, have invented certain new and useful Improvements in Car Trucks; and I do hereby declare the following to be a full, clear and exact description of the invention, such as will enable others skilled in the art to which it appertains to make and use the same.

My invention relates to flexible car trucks and more particularly to an improved type of flexible truck which is provided with means for resisting relative longitudinal displacements of the side frame members from normal or square position and for returning said frame members to normal upon cessation of the force causing them to assume an out of square relation.

The principal object of the invention is to provide a car truck of the character indicated which consists of few and simple parts. A further object is to produce a construction in which the springs for yieldingly supporting the bolster against downward movement may be also utilized to control the relative longitudinal movements of the truck side frames.

The principal feature of my invention by which the foregoing objects are accomplished consists in providing means for torsionally energizing the bolster supporting springs upon relative longitudinal movements of the truck side frames and in employing the resistance of these springs as a means for yieldingly maintaining the side frames in normal position. There are further features of the invention residing in particular details of construction and in special combinations of elements, all as will hereinafter appear.

In the drawings embodying the preferred form of my invention, the scope whereof is pointed out in the claims,—

Figure 1 is a view, partly in plan and partly in horizontal section, of a car truck embodying the invention, the parts being shown in a position such as they assume when passing around a curve, and the bolster, which may be of the type commonly employed in flexible trucks, being omitted.

Figure 2 is a detail side elevation of the central portion of one of the side frame members and the parts associated therewith.

Figure 3 is a section on the line 3—3, Fig. 2.

In the drawings, 1, 1 are truck side frame members which are capable of relative movement longitudinally of the truck. Each of the side frames is furnished at its opposite ends with journal boxes 2 receiving the journal ends of axles 3 upon which the truck wheels 4 are mounted. If, as shown, the journal boxes are not formed integral with the side frame members they may be connected thereto by means of the usual journal box bolts 5.

Each of the said side frame members 1 is provided midway between the journal boxes 2 with a bolster opening 6 into which the opposite ends of the bolster 7 extend, sufficient clearance being provided, as indicated at 8, between the sides of the bolster and the neighboring faces of the truck columns 9 to permit the bolster to turn or angle freely in a horizontal plane when the side frame members 1 move longitudinally of the truck with respect to each other.

The side frames are preferably connected across the truck by means of a spring plank 10 whose ends project into the lower portions of the bolster openings 6 and rest upon the side frame members. A convenient means of movably connecting the spring plank to the side frames consists in providing each of the latter with a pivot boss 11 which projects into a correspondingly formed aperture 12 in the adjacent end of the spring plank.

The bolster 7 is yieldingly supported against downward vertical movement by means of coil springs 13 which are seated upon the spring plank 10. These springs, by being torsionally energized, also serve to resist relative longitudinal displacement of the side frame members from normal position and to restore the truck parts to normal relation. To enable them to be torsionally energized to control the longitudinal movements of the side frame members, the said springs 13 are preferably provided at their upper ends with arms or projecting portions 14 which overlap the respective truck columns 9; and at their lower ends the springs 13 are formed with projecting portions 15 enabling them to be rigidly connected to the spring plank 10. The connection between the springs 13 and the spring plank may be simply effected by providing the latter with openings 16 into which the projecting ends 15 of the springs closely fit.

To prevent any possibility of the springs 13 being displaced from proper operative relation to the bolster and spring plank when said springs are torsionally energized, the bolster 7 and spring plank 10 are preferably provided with bosses 17 which serve to center the springs.

When the said side frame members 1 are displaced longitudinally with respect to each other from normal position as occurs, for example, when the truck passes around a curve, the bolster 7 and the spring plank 10 turn horizontally, changing their angular relations to the side frames. As the springs 13 are attached to the spring plank and turn therewith, this movement of the spring plank results in torsionally energizing those springs whose rotation is restrained by the engagement of their upper ends 14 with the columns 9 of the side frame members, the energized springs constituting a diagonally arranged pair. The other diagonally arranged pair of springs at each end of the bolster is not torsionally energized by the described angular movement of the spring plank but remains inactive since the movement of the spring plank which energizes one diagonally arranged pair carries the arms 14 of the other pair of springs away from the side frames. If the side frames 1 are displaced longitudinally so as to cause a turning or angular movement of the spring plank 10 in the opposite direction to that just described, the springs 13 which before were inactive will be torsionally energized in a similar manner and those which before were energized will remain inactive, the neighboring pairs of diagonally arranged springs operating independently and dissimultaneously. When the force which has caused the side frame members 1 to be displaced from normal position ceases to act those springs which have been torsionally energized will compel the spring plank 10 to reassume its normal position, thereby restoring the side frames to square relation.

I claim:—

1. In a car truck, the combination with side frame members which are relatively movable longitudinally of the truck, of a vertically movable bolster which is adapted to angle horizontally with respect to said side frame members, and spring means for vertically supporting said bolster, said spring means being adapted to be energized by a relative longitudinal displacement of said frame members from normal position to thereby resist said displacement.

2. In a car truck, the combination with side frame members which are relatively movable longitudinally of the truck, of a vertically movable bolster which is adapted to angle horizontally with respect to said side frame members, and springs for vertically supporting said bolster, said springs being adapted to be torsionally energized upon a relative longitudinal displacement of said frame members from normal position.

3. In a car truck, the combination with side frame members which are relatively movable longitudinally of the truck, of a vertically movable bolster which is adapted to angle horizontally with respect to said side frame members, a spring plank movably connecting said side frame members, and springs interposed between said bolster and spring plank for yieldingly supporting said bolster, said springs being adapted to be torsionally energized upon a relative longitudinal displacement of said side frame members from normal position.

4. In a car truck, the combination with side frame members which are relatively movable longitudinally of the truck, of a vertically movable bolster which is adapted to angle horizontally with respect to said side frame members, and a plurality of springs operatively interposed between said bolster and the respective side frame members and adapted yieldingly to support said bolster against downward vertical movement, some of said springs being adapted to be torsionally energized upon a relative longitudinal displacement of said side frame members corresponding to an angular horizontal movement of said bolster in one direction from normal position, and other of said springs being adapted to be torsionally energized upon an angular horizontal movement of said bolster in the opposite direction.

5. In a car truck, the combination with side frame members which are relatively movable longitudinally of the truck, of a vertically movable bolster which is adapted to angle horizontally with respect to said side frame members, and a plurality of springs for yieldingly supporting said bolster against downward vertical movement, certain of said springs being adapted to be energized independently of other of said springs upon a relative longitudinal displacement of said side frame members from normal position.

6. In a car truck, the combination with side frame members which are relatively movable longitudinally of the truck, of a vertically movable bolster which is adapted to angle horizontally with respect to said side frame members, and means for yieldingly resisting relative longitudinal displacement of said side frame members from normal position, said means including a plurality of springs which are adapted to be torsionally energized dissimultaneously.

7. In a car truck, the combination with side frame members which are relatively movable longitudinally of the truck, of a vertically movable bolster which is adapted to angle horizontally with respect to said side frame members, a spring plank pivotally connecting said frame members, and a plurality of coil springs interposed between said bolster and said spring plank, each of said springs being provided with means for engaging the adjacent side frame member to restrain free axial rotation of said spring in one direction, and each of said springs being attached to said spring plank so as to turn therewith when said spring plank moves pivotally with respect to said frame members.

8. In a car truck, the combination with side frame members which are relatively movable longitudinally of the truck, of a bolster, springs interposed between the opposite ends of said bolster and said side frame members, and means for energizing said springs upon a relative longitudinal movement of said side frame members from normal position.

9. In a car truck, the combination with side frame members which are relatively movable longitudinally of the truck, of bolster supporting springs carried by said side frame members, and means interposed between said side frame members and said springs for torsionally energizing the latter upon a relative longitudinal movement of said side frame members from normal position.

10. In a car truck, the combination with side frame members which are relatively movable longitudinally of the truck, of bolster supporting springs operatively interposed between said side frame members and said bolster, and means extending transversely of the truck for energizing said springs upon a relative longitudinal movement of said side frame members from normal position.

11. In a car truck, the combination with side frame members which are relatively movable longitudinally of the truck, of bolster supporting springs carried by said side frame members, means for preventing the free rotation of each of said springs in one direction, and means interposed between said springs and said side frame members for independently energizing certain of said springs upon longitudinal displacement of said side frame members in opposite directions from normal position.

In testimony whereof I affix my signature.

BYERS W. KADEL.